US00RE38191E

(19) United States
(12) Reissued Patent
Otte

(10) Patent Number: US RE38,191 E
(45) Date of Reissued Patent: Jul. 22, 2003

(54) TOILET SEAT AND COVER COMBINATION

(75) Inventor: Timothy J. Otte, Sheboygan Falls, WI (US)

(73) Assignee: Bemis Manufacturing Company, Sheboygan Falls, WI (US)

(21) Appl. No.: 29/127,569

(22) Filed: Aug. 8, 2000

Related U.S. Patent Documents

Reissue of:
(64) Patent No.: Des. 423,655
Issued: Apr. 25, 2000
Appl. No.: 29/103,513
Filed: Apr. 15, 1999

(51) LOC (6) Cl. ..... 23-02
(52) U.S. Cl. ..... D23/311
(58) Field of Search ..... D23/295–30, 303, D23/309, 311–312; 4/217, 234, 236, 237–239, 242.1, 245.1, 245.6, 245.7, 902, DIG. 6

(56) References Cited

U.S. PATENT DOCUMENTS

| | | | |
|---|---|---|---|
| 1,194,073 | A | 8/1916 | Romine |
| 1,287,942 | A | 4/1918 | Florey |
| 1,829,526 | A | 10/1931 | Leslie |
| 2,903,713 | A | 9/1959 | Previte |
| 2,966,686 | A | 1/1961 | Beneke, Jr. |
| 3,484,876 | A | 12/1969 | Thomas |
| D237,969 | S | 12/1975 | Firdmann |
| D238,427 | S | 1/1976 | Harrison |
| D240,038 | S | 5/1976 | Colani |
| D254,684 | S | 4/1980 | Boyter |
| D261,029 | S | 9/1981 | Boyter |
| D262,733 | S | 1/1982 | Bjorn |
| D271,417 | S | 11/1983 | Thygesen et al. |
| D278,846 | S | 5/1985 | Harrison et al. |
| D287,846 | S | 1/1987 | Nishida |
| D292,018 | S | 9/1987 | Lipoix |
| 4,736,471 | A | 4/1988 | Johnson |
| D318,525 | S | 7/1991 | Bock |
| D332,830 | S | 1/1993 | Gerlach |
| D333,345 | S | 2/1993 | Strahan |
| D348,926 | S | 7/1994 | Rasmussen |
| D352,995 | S | 11/1994 | Reid et al. |
| D355,713 | S | 2/1995 | Kelly |

(List continued on next page.)

*Primary Examiner*—Louis S. Zarfas
*Assistant Examiner*—Robert A. Delehanty
(74) *Attorney, Agent, or Firm*—Michael Best & Friedrich LLP

(57) CLAIM

The ornamental design for a toilet seat and cover combination, as shown and described.

DESCRIPTION

FIG. 1 is a front perspective view of a toilet seat and cover combination showing my new design with the cover lowered;

FIG. 4 is a left side elevational view thereof, the right side view being a mirror image of that shown.

FIG. 5 is a front elevational view thereof;

FIG. 6 is a rear elevational view thereof; and,

FIG. 7 is a front perspective view of the seat portion with the lid removed for ease of illustration.

Figure 2:
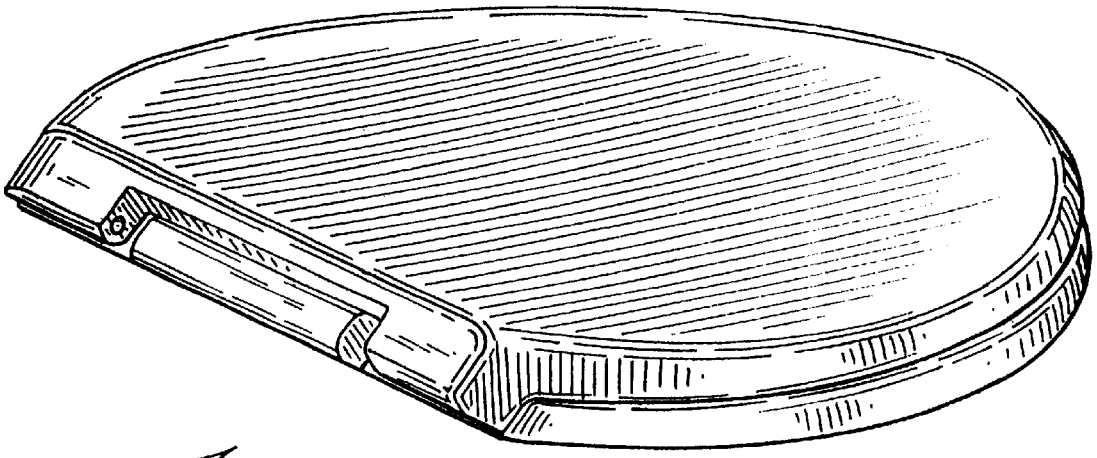
FIG. 2 is a rear perspective view thereof.
Figure 3:
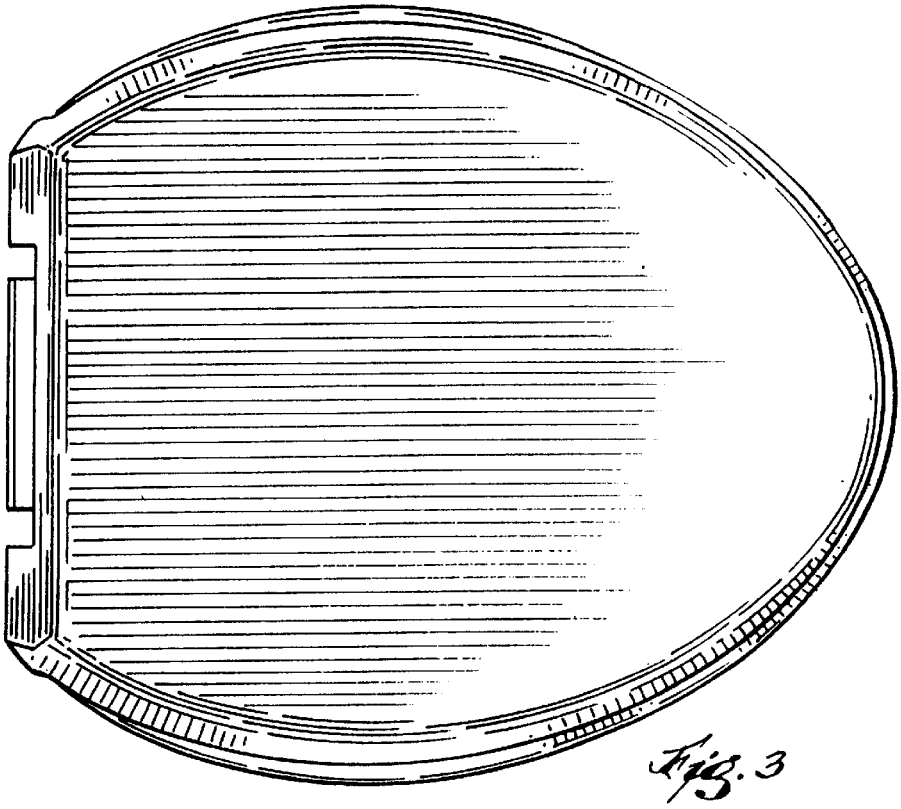
FIG. 3 is a top plan view thereof.

The [bottom] portions of the seat and cover not shown *and the portions shown in dotted lines* are not part of the claimed design.

1 Claim, 3 Drawing Sheets

Matter enclosed in heavy brackets [ ] appears in the original patent, but forms no part of this reissue; matter printed in italics indicates the additions made by reissue.

AMENDED

U.S. PATENT DOCUMENTS

| | | | |
|---|---|---|---|
| 5,432,956 | A | 7/1995 | Park |
| D371,191 | S | 6/1996 | McNeill |
| D379,498 | S | 5/1997 | Matsunaga |
| D387,851 | S | 12/1997 | Pieters |
| D389,903 | S | 1/1998 | Jones et al. |
| 5,829,073 | A | 11/1998 | Lee |
| D402,740 | S | 12/1998 | Ochi et al. |
| D413,969 | S | 9/1999 | Lin |
| D420,436 | S | 2/2000 | Easley |
| D423,655 | S | 4/2000 | Otte |
| D428,126 | S | 7/2000 | Hulsebus et al. |
| D432,220 | S | 10/2000 | Hulsebus et al. |
| D434,839 | S | 12/2000 | Hulsebus et al. |
| D437,921 | S | 2/2001 | Hulsebus |

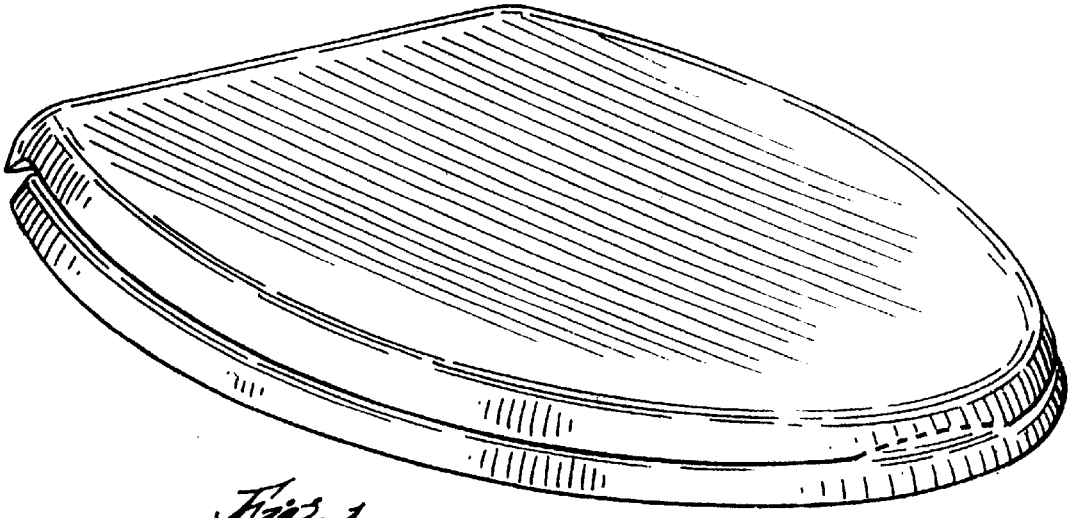
Fig. 1
AMENDED

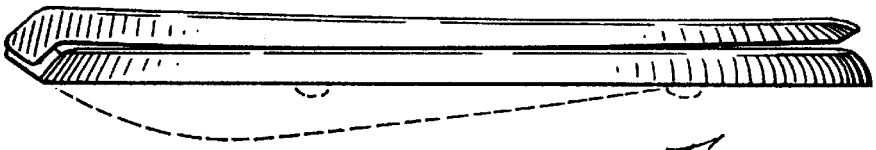
Fig. 4
AMENDED
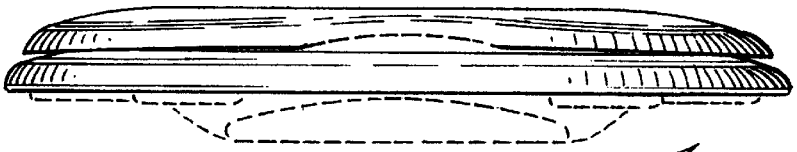
Fig. 5
AMENDED

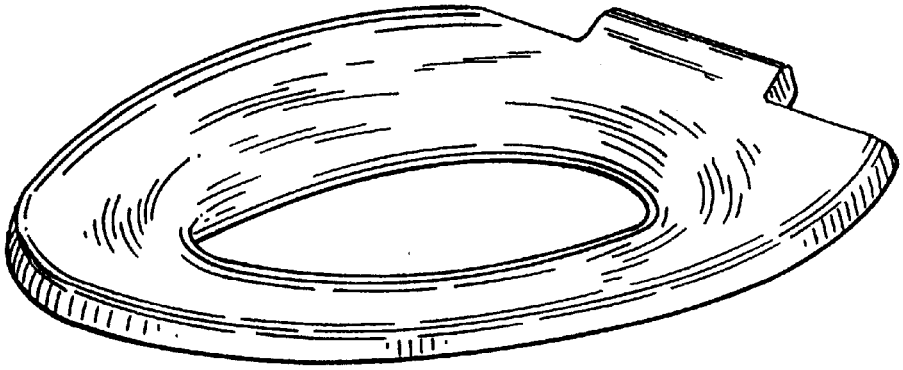

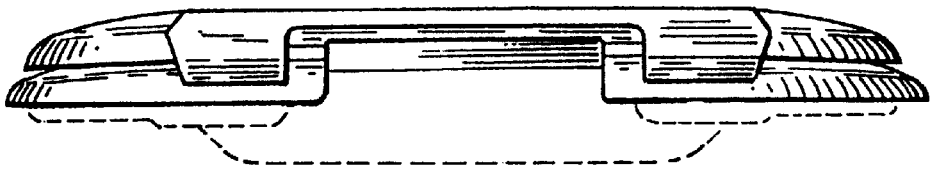
Fig. 6
AMENDED
Fig. 7